United States Patent
DeCoster et al.

(10) Patent No.: US 11,890,704 B2
(45) Date of Patent: Feb. 6, 2024

(54) SYSTEM AND METHOD FOR CONDITIONING AN OUTPUT OF A WELDING TYPE POWER SUPPLY

(71) Applicant: Illinois Tool Works Inc., Glenview, IL (US)

(72) Inventors: Al J. DeCoster, Kaukauna, WI (US); Mark S. Kadlec, Shiocton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 3 days.

(21) Appl. No.: 16/003,697

(22) Filed: Jun. 8, 2018

(65) Prior Publication Data

US 2018/0354050 A1    Dec. 13, 2018

Related U.S. Application Data

(60) Provisional application No. 62/517,008, filed on Jun. 8, 2017.

(51) Int. Cl.
    *B23K 9/09*      (2006.01)
    *B23K 9/133*      (2006.01)
    (Continued)

(52) U.S. Cl.
    CPC ............ *B23K 9/093* (2013.01); *B23K 9/0953* (2013.01); *B23K 9/1062* (2013.01); *B23K 9/133* (2013.01)

(58) Field of Classification Search
CPC .... B23K 9/093; B23K 9/0953; B23K 9/1062; B23K 9/133; B23K 9/095
See application file for complete search history.

(56) References Cited

U.S. PATENT DOCUMENTS

| | | | |
|---|---|---|---|
| 6,441,342 B1 * | 8/2002 | Hsu ........................ | B23K 9/091 |
| | | | 219/130.01 |
| 2008/0296276 A1 * | 12/2008 | Schartner ............. | B23K 9/1031 |
| | | | 219/130.31 |

(Continued)

FOREIGN PATENT DOCUMENTS

| | | |
|---|---|---|
| CN | 85106067 | 10/1986 |
| CN | 1356763 | 7/2002 |

(Continued)

OTHER PUBLICATIONS

Canadian Office Action Appln No. 3,066,730 dated Apr. 14, 2021.

(Continued)

*Primary Examiner* — Nathaniel E Wiehe
*Assistant Examiner* — Dilnessa B Belay
(74) *Attorney, Agent, or Firm* — McAndrews, Held & Malloy, Ltd.

(57) ABSTRACT

A welding-type system includes a wire feeder to provide an electrode wire to a welding-type torch. A welding-type power supply to provide power to one or both of the welding-type torch or the wire feeder. A controller is configured to control a sense voltage circuit to provide a sense voltage to charge a control capacitor, monitor a voltage feedback signal, determine that a wire feeder is activated based on a first change in the voltage feedback signal, control the switched mode power supply to provide a constant voltage output signal during a welding operation, control the switched mode power supply to provide the pulsed power output in response to completion of the welding operation, determine that the wire feeder is deactivated based on a second change in the feedback signal, adjust a pulse rate of the output signal to achieve an RMS value below a predetermined RMS level.

19 Claims, 6 Drawing Sheets

(51) Int. Cl.
B23K 9/10 (2006.01)
B23K 9/095 (2006.01)

(56) References Cited

U.S. PATENT DOCUMENTS

| | | | | |
|---|---|---|---|---|
| 2009/0234483 A1* | 9/2009 | Leko | ............... | B23K 9/0953 |
| | | | | 700/110 |
| 2010/0301029 A1* | 12/2010 | Meckler | ............... | B23K 9/095 |
| | | | | 219/130.1 |
| 2014/0097164 A1* | 4/2014 | Beistle | ............... | B23K 9/1043 |
| | | | | 219/130.33 |
| 2014/0124492 A1* | 5/2014 | Daniel | ............... | B23K 9/095 |
| | | | | 219/130.51 |
| 2016/0311046 A1 | 10/2016 | Aguilar | | |

FOREIGN PATENT DOCUMENTS

| | | |
|---|---|---|
| CN | 1838517 | 9/2006 |
| CN | 1871093 | 11/2006 |
| CN | 104768692 | 7/2015 |
| EP | 1206992 | 5/2002 |

OTHER PUBLICATIONS

Int'l Search Report and Written Opinion Appln No. PCT/US2018/036721 dated Oct. 9, 2018.

European Office Communication with extended Search Report Appln No. 22209229.8 dated Mar. 7, 2023.

* cited by examiner

SYSTEM AND METHOD FOR CONDITIONING AN OUTPUT OF A WELDING TYPE POWER SUPPLY

BACKGROUND

Power supplies often provide power to one or more components (e.g., a welding torch, a plasma cutter, a wire feeder, an induction heater, etc.) that have different power requirements. The power supply may adjust an output to accommodate changes in a load experienced by the power supply. Maintaining an output level within predefined limits is desirable to ensure proper operation of such systems.

SUMMARY

Systems and methods are disclosed for conditioning an output of a welding type power supply. In particular, a welding-type system is configured to provide a pulsed output signal to drive a wire feeder, and to adjust the signal in response to a change in load of the power supply output and/or identification of an open circuit voltage (OCV) condition where a level of the voltage exceeds a predetermined threshold voltage level.

In disclosed examples, a welding-type system includes a wire feeder to provide an electrode wire to a welding-type torch. A welding-type power supply to provide power to one or both of the welding-type torch or the wire feeder. The welding-type power supply includes a controller configured to monitor a pulsed output signal of the welding-type power supply; calculate a change in the pulsed output signal based on the monitored pulsed output signal; determine whether the wire feeder is activated or deactivated based on the change; and adjust a pulse interval of the pulsed output signal to achieve an RMS value for the pulsed output signal that is within a predetermined threshold RMS level based on the determination.

In some examples, the controller is further configured to control a switched mode power supply to provide the pulsed power output to operate the wire feeder based on a determination that the wire feeder is activated.

In examples, the controller is further configured to control the switched mode power supply to provide a constant voltage output signal during a welding-type operation; and control the switched mode power supply to provide the pulsed power output in response to completion of the welding type operation.

In some examples, a calculation engine configured to compare the change in the pulsed output signal to a plurality of threshold output values.

In examples, the controller is further configured to identify an open circuit voltage condition at the power supply if the change exceeds a first threshold output level of the plurality of threshold output values. In some examples, the amount of adjustment is based on the comparison.

In examples, the controller is further configured to deactivate the pulsed output signal in response to a determination that the wire feeder is not drawing power from the power supply.

In some examples, the power supply is a first power supply configured to provide power to generate an arc at the welding-type torch, and further comprising a second power supply configured to provide power to the wire feeder.

In examples, the controller is further configured to monitor a time period of the calculated change in the pulsed output; compare the time period to a plurality of threshold time periods stored in a memory; and adjust the pulsed power output based on the comparison.

In some examples, a network connection, wherein the controller is further configured to receive information regarding threshold values from a remote source via the network connection to update the plurality of thresholds in memory.

In examples, the controller is further configured to adjust the pulse interval by adjusting a frequency of the pulsed output signal. In some examples, the controller is further configured to adjust the pulse interval by adjusting a length of one of a higher or a lower portion of the pulsed output.

In another disclosed example, a welding-type system includes a wire feeder to provide an electrode wire to a welding-type torch. A welding-type power supply to provide power to one or both of the welding-type torch or the wire feeder. The welding-type power supply includes a controller configured to control a sense voltage circuit to provide a sense voltage to an output of the power supply for the wire feeder; monitor a voltage feedback signal associated with the sense voltage; determine whether the wire feeder is activated or deactivated based on a change in the voltage feedback signal; control a switched mode power supply of the power supply to provide a first power output to operate the wire feeder in response to a determination that the wire feeder is activated; control the switched mode power supply of the power supply to provide a second pulsed power output in response to a determination that the wire feeder is deactivated, the first pulsed power output being greater than the second pulsed power output; and control the sense voltage circuit to provide the sense voltage and continue to monitor the sense voltage signal in response to the determination that the wire feeder is deactivated.

In some examples, the controller is further configured to determine that the wire feeder is activated based on a first change in the voltage feedback signal; and determine that the wire feeder is deactivated based on a second change in the feedback signal.

In examples, the controller is further configured to determine an open circuit voltage condition at the output based on a third change in the voltage feedback signal In some examples, the controller is further configured to sample the feedback signal over a predetermined period of time; and determine if a value of the feedback signal is increasing during the predetermined period of time In examples, the controller is further configured to determine that one or more control capacitors of the wire feeder are being charged in response to a determination of an increased value.

In some examples, the controller is further configured to control the switched mode power supply to provide a constant voltage output signal during a welding type operation. In examples, the wire feeder is a sensing voltage wire feeder.

In some examples, the controller receives the voltage feedback signal in a closed control loop.

BRIEF DESCRIPTION OF THE DRAWINGS

The figures are not necessarily to scale. Where appropriate, similar or identical reference numbers are used to refer to similar or identical components.

DETAILED DESCRIPTION

In examples disclosed herein, a welding-type system is configured to control an output signal of a power supply. In particular, the welding-type system determines when a wire feeder is disconnected from a welding-type power source, resulting in an open circuit voltage condition. In response, the welding-type system is configured to monitor the output. When an open circuit voltage (OCV) level is detected, the output signal can be turned off and a low voltage sensing circuit can be enabled. In some examples, when the voltage level associated with the OCV condition exceeds the predetermined threshold value, the OCV level can be reduced by adjusting the pulse rate of the output signal.

When the power supply is charging the wire feeder control system, the power supply is configured to pulse the output (e.g., by a switched mode power supply). The pulsed output voltage level at this stage (e.g., approximately 17V), is considerably lower than the OCV of the power source, as well as a threshold voltage limit associated with one or more industrial standard levels. However, in some examples, the OCV of the welding-type power supply (e.g., a Dynasty/Maxstar 280 power source from Miller Electric, Inc.) is above a threshold voltage level associated with the industrial standard level (e.g., at approximately 57V).

During a welding-type operation (e.g., arc welding), no OCV condition exists, such that the industrial standard is not invoked. Further, connecting a wire feeder and drawing power for operation may cause the output of the power supply to drop, but to a minor degree (e.g., less than 2%, or to approximately 56V). In a system such as a welding-type system, the relatively small difference in voltage is difficult to detect.

If no welding operation is in progress and a pulsed output is being generated, however, disconnection of the wire feeder will return the pulsed voltage amplitude to the relatively higher OCV of the welding type power supply (e.g., from approximately 17V approximately 57V). The magnitude of this change can be reliably detected (e.g., upon disconnection of the wire feeder), which can prompt a response from the power supply. For example, the output can be turned off and a low voltage sensing circuit enabled, or, the frequency of the pulsed output can be adjusted in order to reduce the DCV of the power source.

For instance, a low voltage sensing circuit can be used, or, the output level can be adjusted to a level that complies with one or more third party standards, such as one or more national industrial requirements for welding type power supplies (see, e.g., Australian Standard, AS 1674.2-2003, Safety in welding and allied processes, Part 2: Electrical, Section 3.2.6 Maximum open-circuit voltage, Category C environment (Clauses 1,3.8.2 and S.1 (c)), hereinafter the "industrial standard"). In an example, the industrial standard requires a DC upper voltage of 35 volts, or an AC upper voltage of 35 volts and 25 volts root-mean-square (RMS).

In some disclosed examples, the power supply is configured to control a switched mode power supply (e.g., an inverter-type power supply) to condition a power output for a. welding type tool (e.g., a MIG torch) and/or one or more accessories (e.g., a wire feeder). A voltage sense circuit can be employed, with a connection before or after a disconnect of the voltage sense wire feeder (see, e.g., FIGS. 1, 2A and 2B).

Figure 3A:
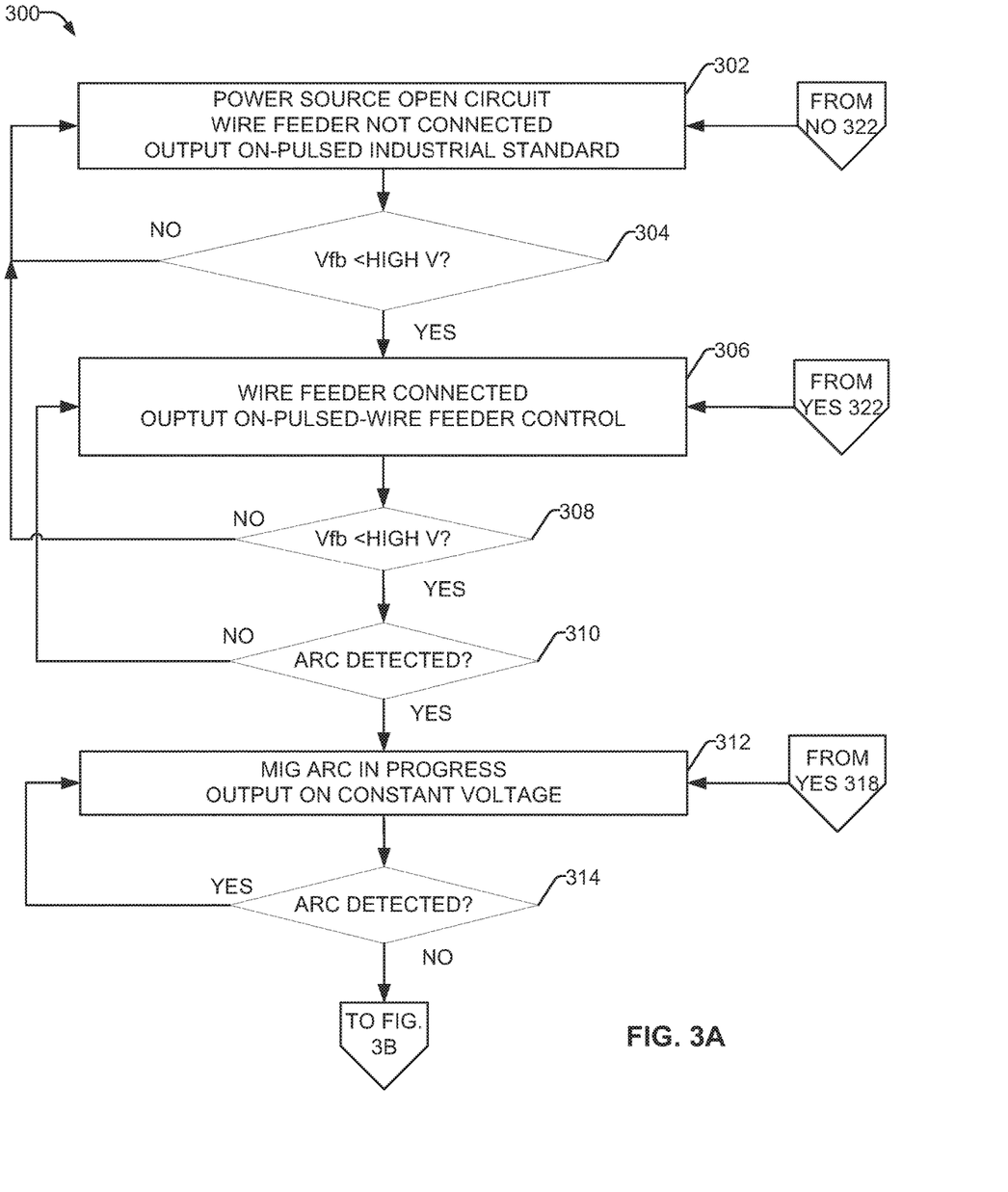
FIGS. 3A and 3B illustrate an example method of conditioning an output of a welding type power supply, in accordance with aspects of this disclosure.
Figure 3B:
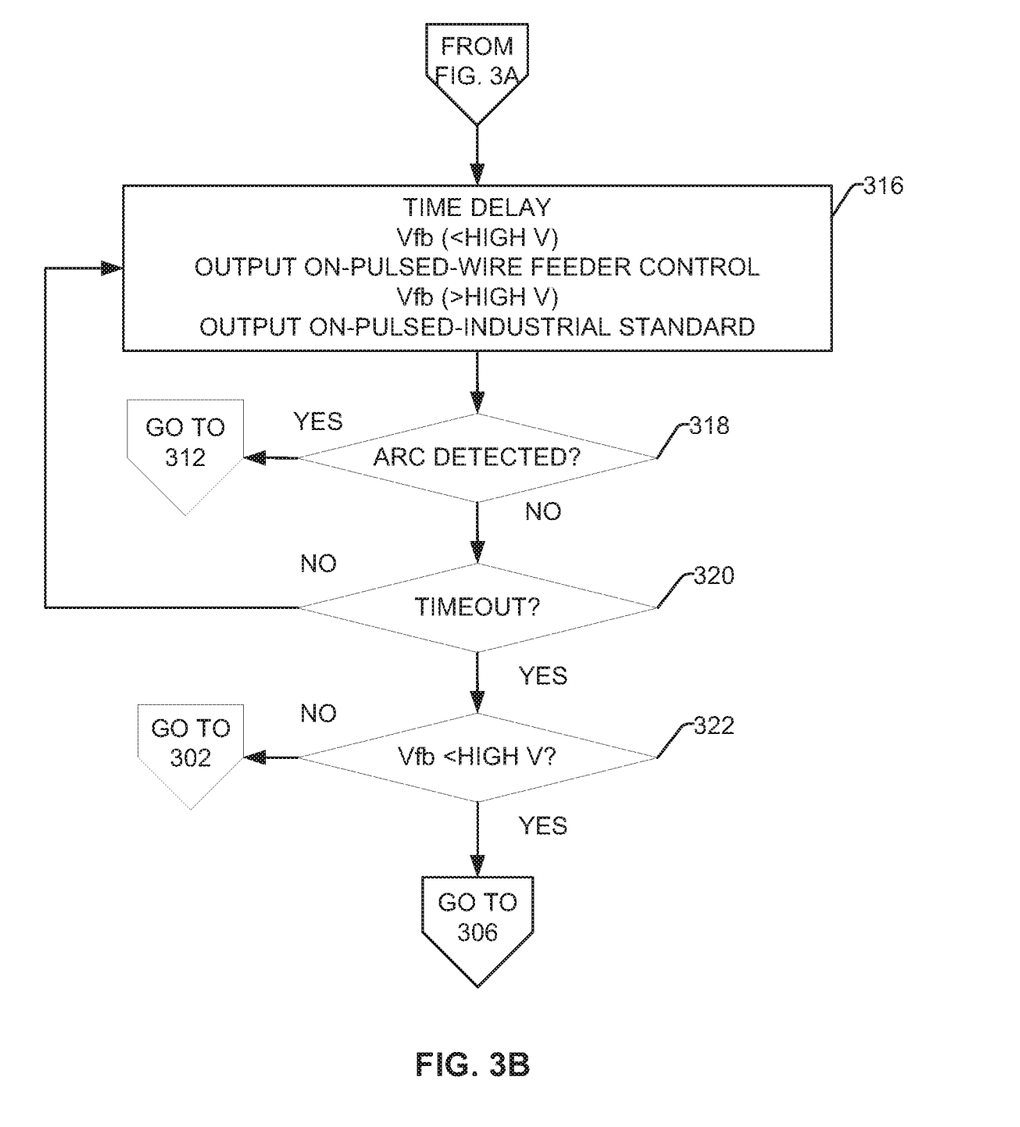

In some examples, a voltage sense circuit is not used, as described herein (see. e.g., FIGS. 3A and 3B). Output of a power supply, including during the transitions to or from an OCV condition, is controlled to maintain a threshold output level within a desired range of values (e.g., corresponding to a predetermined range of threshold OCV levels, such as a threshold associated with the industrial standard).

Generally, the pulsed voltage level required to operate the wire feeder is substantially lower than the OCV rating of the welding type power supply. Employing a switched mode power supply to condition the power output from the power supply provides flexibility to, in response to detection of a changing output signal, adjust the output to a desired level. For example, changes in the output signal can correspond to disconnection of the wire feeder which can result in an OCV condition at a level above that required by the industrial standard. A power supply output is considered to be in an open circuit condition when powered on and no load is present (e.g., no wire feeder is connected).

In some examples, the wire feeder can be connected and drawing power from the low voltage pulsed signal, as described above. When the power supply prepares to start an arc, the controller controls the power supply to adjust the output signal to accommodate the increased power demand, such as by outputting a constant, high voltage signal suitable to generate an arc (e.g., a constant voltage (CV) output). In this case, an inline wire feeder will draw what power is needed for operation as well as maintenance of the control capacitors.

Upon deactivation of the arc, the controller controls the switched mode power supply to return to a pulsed output mode from a CV output. Due to the increased voltage level, the switched mode power supply automatically increases the lower value interval rate to ensure the RMS value of the signal is at or below the predetermined RMS value. The feedback signal is continuously monitored, such that when the higher voltage pulsed output level lowers to an appropriate level, the frequency of the pulsed output can return to a faster pulse corresponding to a low output voltage.

In disclosed examples when a sense voltage circuit is not in us, the power supply controls a pulsed output signal with power sufficient to charge the wire feeder's control circuit (e.g., control capacitors) prior to activation of the wire feeder.

As used herein, the term "Open circuit voltage" (OCV) is the difference of electrical potential between two terminals of a device when disconnected from any circuit. For example, when two terminals are not connected to anything (an "open circuit"), no current can flow into or out of either terminal. The voltage OCV between the terminals is the open circuit voltage of the device.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" (e.g., controller, control circuit, etc.) includes any analog and/or digital components, power and/or control elements, such as a microprocessor, digital signal processor (DSP), software, and the like, discrete and/or integrated components, or portions and/or combinations thereof.

Figure 1:
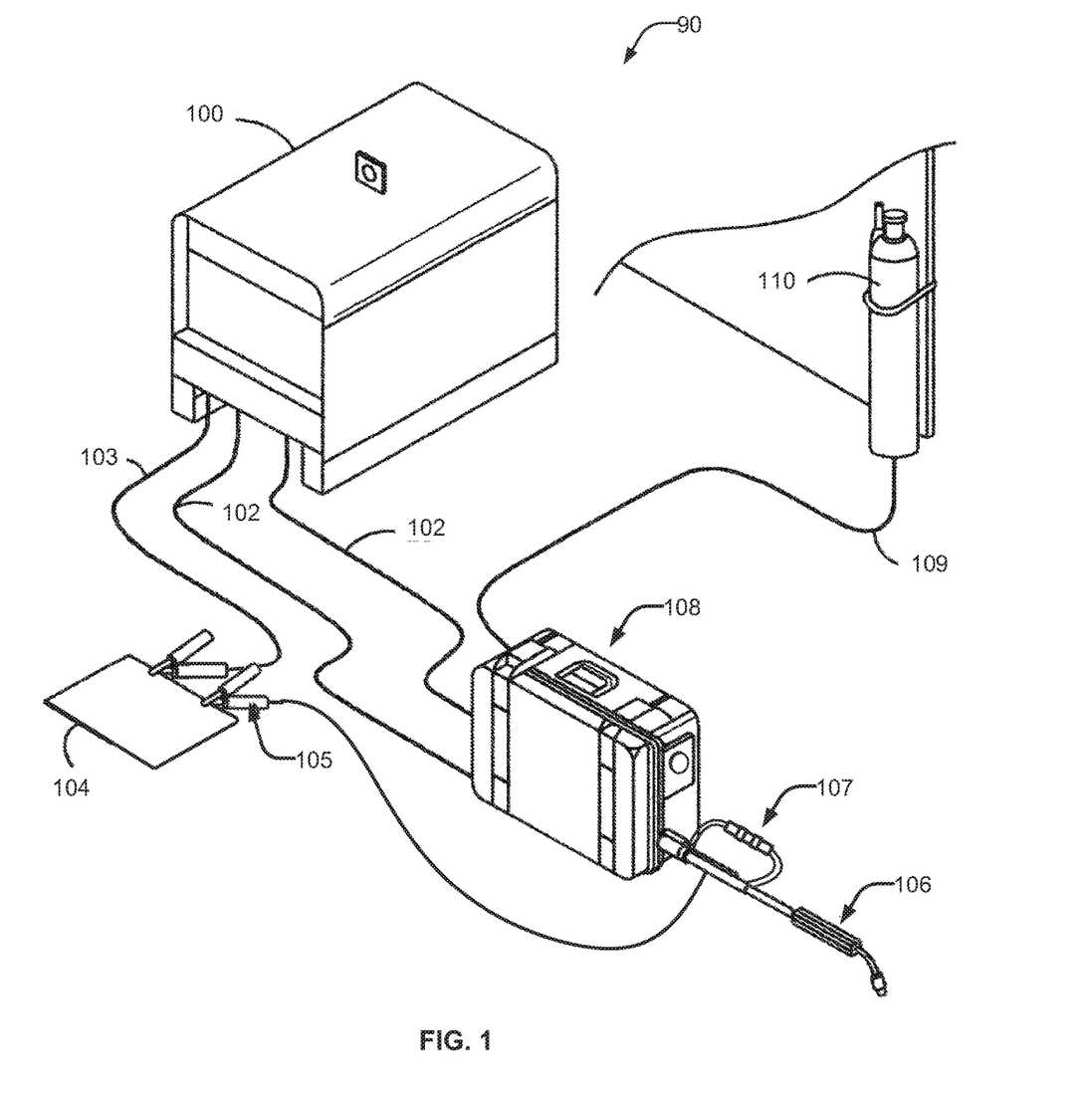
FIG. 1 illustrates an example is an example welding-type system in accordance with aspects of this disclosure.

FIG. 1 is an example welding-type system 90 which includes welding-type power supply 100 (e.g., a constant voltage (CV) welding power supply), a weld cable to feeder 102, a work cable 103 connected to a workpiece 104, a voltage sensing clamp 105, a welding-type tool 106 (e.g., a MIG torch), a torch trigger receptacle 107, a wire feeder 108, a gas hose 109 and a gas cylinder 110.

The welding-type power supply 100 is configured to generate a constant current (CC) output to power the welding tool 106. Changes in the output, both current and voltage, are dependent on a desired operation and/or load (e.g., a wire feeder, an arc welding torch, etc.). When the power supply 100 is not connected to a load (e.g., an open circuit condition), no current is flowing and the OCV of the power supply 100 will revert to a constant output at a relatively high voltage level (e.g., in some example power supplies, at approximately 57V).

In an example, the power supply 100 employs a switched mode power supply to provide the pulsed output, such as to power to the wire feeder 108. Disconnection of the wire feeder 108 results in an open circuit condition as described above. The result is an increase in the output at the power supply OCV level (e.g., a doubling or e in output voltage). The power supply 100 is thus configured to adjust the pulsed output signal to ensure an RMS value of the output signal remains below a threshold RMS value (e.g., corresponding to selected industrial standard requirements).

In some examples, a low voltage, low current supply power source (referred to as "sense voltage" or "lift voltage") can be used prior to activation of wire feeder 108 and/or a welding type torch 106. For example, the sense voltage output from the power supply 100 may initially serve to charge one or more capacitors associated with control of the wire feeder 108.

In examples where the sense voltage circuit is not being used, when the wire feeder 108 is initially connected, the output is pulsed for a period of time. The pulsed output signal provides the current as required by the wire feeder 108 to charge the control circuit capacitors to a level sufficient for the control circuit to operate the wire feeder 108 (in some example wire feeders, approximately 12V).

In both examples, upon activation of the wire feeder 108, the power output may experience a drop in voltage due to the additional load from the wire feeder 108. In response, the switched mode power supply increases the voltage of the pulsed mode signal to a level sufficient to operate the wire feeder 108.

During operation of the wire feeder 108 the frequency of the pulsed signal can be modulated about a voltage feedback signal at a voltage level adequate to supply operating power for the wire feeder control. The output signal is pulsed between a high voltage level, and a low voltage level (or "off" time) with no or relatively low voltage. For example, during the low output time of the pulsed signal, no current may come from the power supply 100. The voltage feedback signal at the output of the power supply 100 during the output peak is at a relatively low voltage (e.g., approximately 17V) with respect to the power supply OCV voltage (e.g., approximately 57V). Further, while the pulsed output signal is off, the voltage feedback decays as the control circuit capacitors of the wire feeder 108 discharges, which will be reflected in the voltage feedback signal.

Upon detection of a large surge in the feedback signal, such as upon striking an arc in the welding type torch 106, the switched mode power supply conditions the output to maintain a constant voltage associated with the welding type power. During this time, the in-line wire feeder 108 draws power from the power supply 108 to operate.

When the wire feeder 108 is disconnected, causing an open circuit condition at the power supply 100, the voltage feedback at the output of the power supply 100 during the output on time will go to the OCV of the power supply 100. During an actual open circuit condition, or a situation following disconnection of a large load which can indicate a false open circuit condition, the output is pulsing between a high voltage value and a low voltage value (e.g., 0V).

In response to a determination of an open circuit condition, the interval of the pulsed signal representing the low (e.g., off) voltage value can be extended to achieve a voltage feedback signal below the threshold RMS value, such as required by the industrial standard. This approach can be implemented with software, hardware, or a combination of both.

In an example power supply using a sense voltage circuit, upon deactivation and/or disconnection of the wire feeder 108, the feedback signal will recognize a spike in voltage as the load decreases. In response, the controller is configured to turn off the pulsed output and reactivate the sense voltage circuit. In the alternative, in power supplies that do not employ a sense voltage circuit, the controller controls the switched mode power supply to generate a pulsed power output maintaining the high (i.e. spiked) voltage level, but extending the lower value interval such that the RMS value associated with the high voltage signal is at or below the predetermined threshold RMS value corresponding to one or more industrial standards.

If over time the signal characteristics do not change (e.g., no load is connected to draw power from the power supply 100), the high voltage, slower pulsed signal can be maintained indefinitely, provided the RMS value is at an appropriate level within the predetermined range.

For the examples using a sense voltage a simpler and lower level OCV can be achieved, while reducing switching strain of on the inverter (e.g., between low voltage and high voltage output). However, in some examples, a sense voltage is not used, which requires the power supply 100 to adjust the output in response to the connected load and desire operation of the power supply 100.

In yet another example, the power supply would have dedicated power sources for different components. For instance, the power supply can include a low voltage power source to drive the wire feeder, as well as a high voltage power source to provide power to the welding torch. The outputs of each power source would be monitored to ensure compliance with the industrial standard.

The power supply is additionally configured to monitor a voltage feedback signal. The feedback signal can sense a period of time (e.g., 200 ms) associated with the drop in voltage and adjust an output accordingly.

Monitoring the pulsed output for a period of time allows the system to tolerate initial changes in power output, such as when the wire feeder is activated or deactivated. Maintaining the output for a designated threshold amount of time, such as when the voltage may spike, or an arc can be struck, or jog of a wire feeder's motor, or where the capacitor(s) have high amounts of energy stored, is used to avoid a false feeder disconnection determination. In some examples, the power supply can monitor the pulsed output for a period of time following a change in the output. For example, if the voltage feedback signal indicates a load has been added, such as the wire feeder has been activated, the switched mode power supply can adjust the pulsed signal to supply power adequate to operate the wire feeder.

Figure 2A:
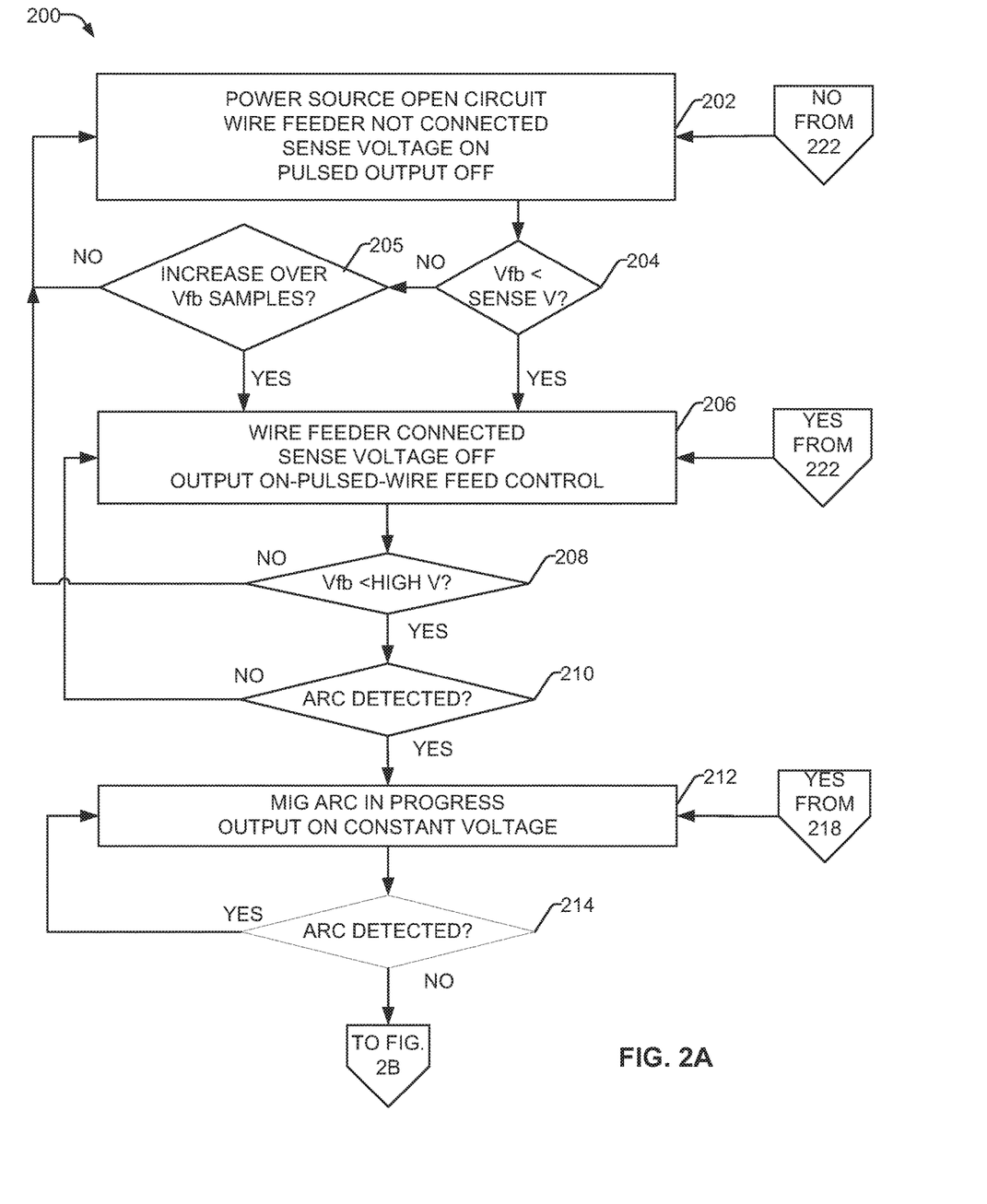
FIGS. 2A and 2B illustrate an example method of conditioning an output of a welding type power supply in accordance with aspects of this disclosure.
Figure 2B:
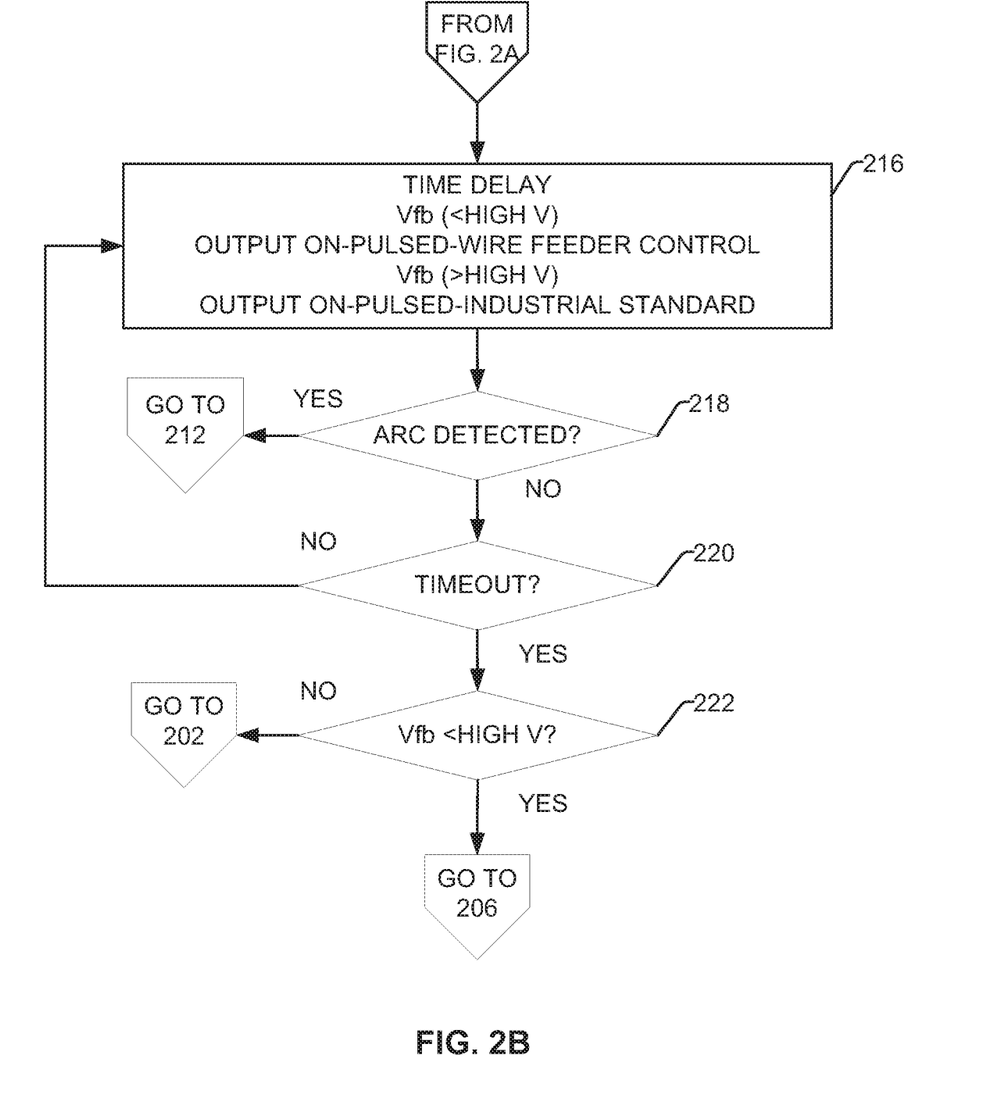

FIGS. 2A and 2B illustrate a flowchart illustrating an example method 200 for conditioning an output of a welding type power supply, in accordance with the example system 90 provided in FIG. 1. In examples, the method can be a number of instructions stored on and implemented by controller 120 of FIG. 4. In block 202, the power source experiences an open circuit condition, the wire feeder is not connected, the pulsed output is off and, in this example, and the sense voltage is on waiting for a wire feeder to be connected.

For example, the welding type power supply generates a sense voltage signal provided to the wire feeder. The sense voltage signal is set at a low voltage level, sufficient to charge control capacitors of the wire feeder but too low to power operation of the wire feeder (e.g., to drive the wire feeder control circuitry, or, to drive an electrode wire).

A voltage feedback is monitored at the power supply 100. In block 204, the controller determines whether the voltage feedback signal indicates a load draw on the sense voltage. For example, upon connection of the wire feeder, the voltage feedback indicates a drop on the sense voltage as the load increases.

In some example wire feeders, connection of the wire feeder may not result in a substantial drop in voltage. In other words, a drop in voltage by a threshold amount following connection of some wire feeders may not be detectable.

Therefore, in addition to or in the alternative of monitoring the voltage feedback signal for an indication of a load draw (e.g., the voltage feedback dropping below a threshold voltage level, such as 1.9V), the controller may be configured to sense a charge associated with one or more control capacitors of the wire feeder. For example, the voltage feedback may be sampled at regular intervals (e.g., every 200 ms). When the voltage feedback signal indicates an increase in voltage level over a series of samples (e.g., over three consecutive samples), the controller may determine that charging of the one or more control capacitors is associated with connection to a wire feeder.

Accordingly, if the feedback signal does not indicate a load on the sense voltage in block 204, the method proceeds to block 205 to determine whether a sampling of the voltage feedback signal indicates an increase over a series of samples. If the feedback signal does not indicate an increase in the voltage level over a series of samples (e.g., one or more control capacitors is not being charged), the controller continues to monitor the feedback signal at block 202. If yes, the method continues to block 206, where the sense voltage is turned off and the pulsed output begins at a power level sufficient to operate the wire feeder. For example, the power supply is charging the wire feeder control system, the power supply is configured to pulse the output (e.g., by a switched mode power supply). The pulsed output voltage level at this stage (e.g., approximately 17V), is considerably lower than the OCV of the power source.

At block 208, the controller determines whether the feedback signal is below a high threshold voltage level. If no, the method returns to block 202. If yes, the controller determines whether an arc is present in block 210. If no, the method returns to block 206. If yes, the method advances to block 212 and outputs constant voltage power sufficient to operate a welding type tool (e.g., a MIG torch). At block 214, the controller continues to monitor the arc output. If an arc is present, the method returns to block 212. If the arc is not present, the method continues to block 216, as provided in FIG. 2B.

In block 216, the controller monitors the output of the system. In this example, the controller determines whether the output is below the high threshold voltage level, for example providing pulsed output to the wire feeder controller. Additionally, the controller determines whether the output is above the high threshold voltage level, such as providing a pulsed signal for a possible OCV condition which are within the limits of the industrial standards. For example, upon disconnection of the wire feeder, however, the pulse voltage amplitude will return to the relatively higher OCV of the welding type power supply (e.g., approximately 57V). The magnitude of this change can be reliably detected (e.g., upon disconnection of the wire feeder), which can prompt a response from the power supply.

In block 218, the controller determines whether an arc is present. If yes, the method returns to block 212 of FIG. 2A. If no, the method advances to block 220, where the controller determines whether the monitoring period has timed out. If no, the method returns to block 216. If yes, the method advances to block 222 where the controller again determines whether the feedback signal is below the high threshold voltage level. If no, the method returns to block 202, where the output is in open circuit condition, with sense voltage turned on and output turned off. If yes, the method advances to block 206 with a pulsed output to power a connected wire feeder.

FIGS. 3A and 3B illustrate a flowchart illustrating an example method 300 for conditioning an output of a welding type power supply, in accordance with the example provided in FIG. 1. The method of FIGS. 3A and 3B is similar to the method of FIGS. 2A and 2B, however no sense voltage circuit is employed in this example. In particular, as provided in block 302, the power source experiences an open circuit condition, the wire feeder is not connected, the pulsed output is on and, in this example, as no sense voltage is used, the pulsed output is monitored and compared against the limits of the industrial standards.

In block 304, the controller determines whether the output signal is below a high threshold voltage level. If no, the method returns to block 302. If yes, the method continues to block 306, where the pulsed output begins at a power level sufficient to operate the wire feeder. The remainder of the method steps of FIGS. 3A and 3B reflect those outlined in FIGS. 2A and 2B, with the block numbering similar to those figures except for progressing in the 300s as opposed to the 200s.

Figure 4:
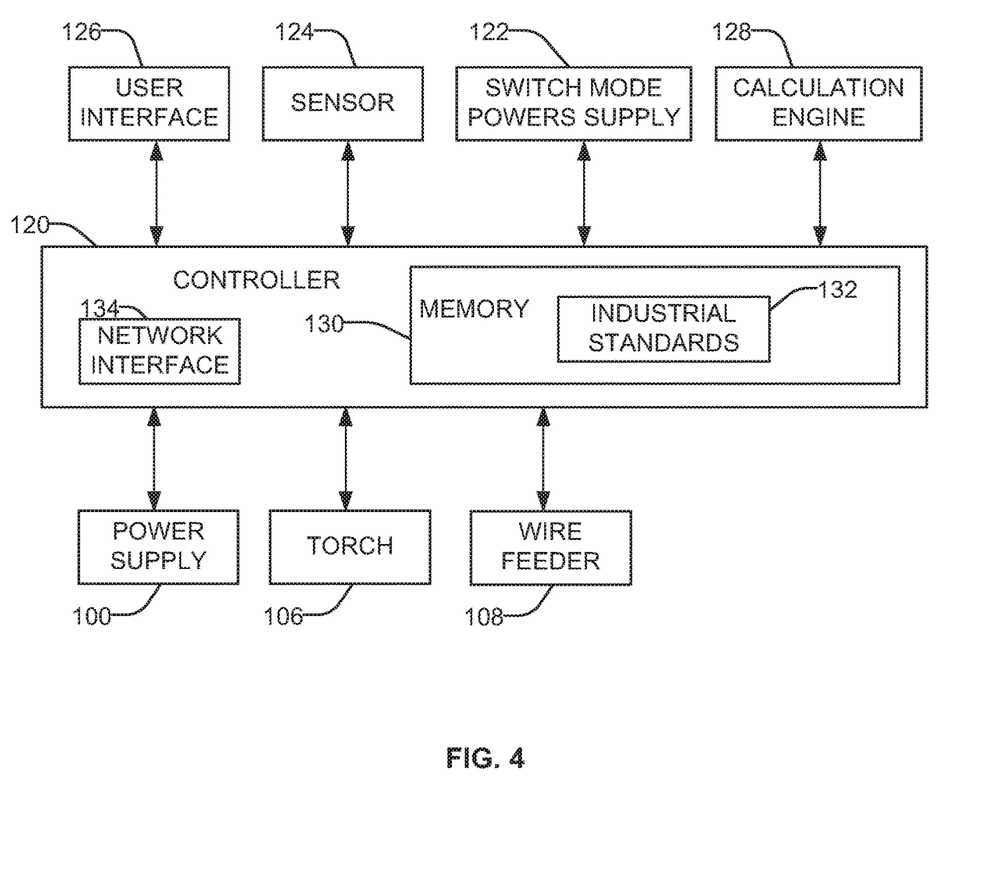
FIG. 4 illustrates a block diagram of an example implementation of a controller of a welding-type system, in accordance with aspects of this disclosure.

FIG. 4 shows a block diagram of an example implementation of a controller 120 that can be configured to control operation of the welding-type system 90, including the power supply 100 and the wire feeder 108. The controller 120 is configured to transmit information to and receive information from one or more devices, such as a user interface 126, a switched mode power supply 122, a calculation engine 128, and the sensor 124 (e.g., a voltage sensor). The controller 120 further includes a memory 130 which contains a matrix or other listing of industrial standards through which the proper adjustment to a pulsed output can be determined.

As described herein, the controller 120 communicates with the user interface 126, the calculation engine 128, the switched mode power supply 122, and the sensor 124 to determine an adjustment to the pulsed output signal, and to control the power supply 100 accordingly. The example controller 120 of FIG. 4 may be a general-purpose computer, a laptop computer, a tablet computer, a mobile device, a server, and/or any other type of computing device integrated with or remote to the power supply. In some examples, the controller 120 is implemented in a cloud computing environment, on one or more physical machines, and/or on one or more virtual machines. In some examples, the controller 120 is integrated with the power supply 100 and/or the wire feeder 108. In other examples, the controller 120 is remote from these devices, and communicates through one or more communication pathways and interfaces (e.g., wired and/or wireless communication, network interfaces 134, etc.)

The controller 120 may receive input from the user interface 126 through which the power supply 100 receives commands from, for example, an operator (e.g., a welder). In some examples, the operator may employ the user interface 126 to choose a welding process (e.g., stick, TIG, MIG, etc.) and desired operating values of the power supply 100 (e.g., output power, voltage, current, etc.). The user interface 126 can be configured for inputting commands and/or customizing controls (e.g., graphical user interfaces (GUI), touch screens, communication pathways, etc.). The controller 120 may be configured to receive and process a plurality of inputs regarding the performance and demands of the power supply 100.

The memory device 130 may include volatile or non-volatile memory, such as ROM, RAM, magnetic storage memory, optical storage memory, or a combination thereof, and may be integrated with the controller 120, located remotely, or a combination of the two. In addition, a variety of control parameters may be stored in the memory device 130 along with code configured to provide a specific output during operation.

For example, the controller 120 is configured to access the memory 130 storing the lists of industrial standards 132 (e.g., threshold RMS values, threshold voltage levels, threshold power output levels, threshold time periods, etc.). In some examples, the controller 120 and the memory 130 are integrally located (e.g., within a computing device). In some examples, the controller 120 is connected to a network interface to access the lists of industrial standards 132 via a communications network.

The controller 120 is configured to receive signal information to determine an OCV condition, as described with respect to FIG. 1. For example, the sensor 124 can be a voltage sensor configured to monitor the feedback signal. The controller 120 controls the power supply 100 to generate a pulsed output at a low voltage in order to operate the wire feeder 108. While the wire feeder 108 is connected, no OCV condition exists, and therefore the industrial standards are not invoked. At the point when the wire feeder 108 is disconnected, the voltage level of the pulsed output will return to the high OCV level. The difference in the voltage, as described above, can be detected though the voltage feedback signal due to the relatively large voltage difference.

The voltage information is provided to a calculation engine 128 to determine whether the output signal corresponds to an OCV level for the power supply 100. The calculation engine 128 further determines whether a pulse rate adjustment is needed to comply with the industrial standard. The calculation engine 128 calculates an RMS value for the signal based on the voltage information and pulse rate, and the controller 120 compares the RMS value against a list of values associated with the industrial standards 132 stored in the memory 130. Based on the comparison, the controller 120 can determine an amount of adjustment needed in the pulse rate to comply with the threshold levels associated with the selected industrial standard requirement. This can be achieved by extending the pulse frequency by increasing the time between pulses (e.g., a longer period between relatively high voltage portion pulsed between relatively lower voltage portions in a waveform) in order to have the OCV signal drop below the industrial standard requirement (e.g., 25V RMS).

In some example systems using sense voltage circuity, at times with large power draws (e.g., MIG arc welding, jogging the wire feeder, etc.), control capacitors of the wire feeder 108 may store large amounts of energy. For a time after a large power draw, the system may falsely read the rise in voltage as a wire feeder disconnect. However, this time is erratic, and dependent on determinations of large power changes that occur over a period of time (e.g., 3 seconds). During this time period, the voltage feedback signal is ineffective in determining whether the wire feeder is connected or if it has been disconnected. Thus, the pulse output frequency is reduced by increasing the time interval of the low voltage pulse, bringing the pulsed output in compliance with the industrial standard (e.g., approximately 25V RMS). After a period of time during which the output is monitored, if the pulsed voltage feedback remains high the power supply determines that the wire feeder has been disconnected. In response, the pulsed output is turned off. In example systems employing a sense voltage circuit, the sense voltage is turned back on based on the determination.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:
 a wire feeder configured to provide an electrode wire to a welding-type torch; and
 a welding-type power supply configured to:
  provide welding-type output power to the welding-type torch and the wire feeder during a welding-type operation; and
  during a non-arc period, provide power to the wire feeder as a pulsed output signal, the welding-type power supply comprising a controller configured to:
   monitor the pulsed output signal of the welding-type power supply, the pulsed output signal to provide power sufficient to operate the wire feeder;
   calculate a change in the pulsed output signal to the wire feeder based on the monitored pulsed output signal;
   determine whether the wire feeder is activated or deactivated based on the change in the pulsed output signal to the wire feeder; and
   control the welding-type power supply to adjust a pulse interval of the pulsed output signal to the wire feeder from a first RMS value to a second RMS value that is within a predetermined threshold RMS range based on the determination that the wire feeder is deactivated by extending the pulse interval of a low voltage level of the second RMS value to achieve the predetermined threshold RMS range.

2. The welding-type system of claim 1, wherein the controller is further configured to control a switched mode power supply to provide the pulsed output signal to operate the wire feeder based on a determination that the wire feeder is activated.

3. The welding-type system of claim 2, wherein the controller is further configured to:
 control the switched mode power supply to provide a constant voltage output signal during the welding-type operation; and
 control the switched mode power supply to provide the pulsed output signal in response to completion of the welding type operation.

4. The welding-type system of claim 1, further comprising a calculation engine configured to compare the change in the pulsed output signal to a plurality of threshold output values.

5. The welding-type system of claim 4, wherein the controller is further configured to identify an open circuit voltage condition at the power supply if the change exceeds a first threshold output level of the plurality of threshold output values.

6. The welding-type system of claim 5, wherein the amount of adjustment to the pulse interval is based on the change.

7. The welding-type system of claim 1, wherein the controller is further configured to deactivate the pulsed output signal in response to a determination that the wire feeder is not drawing power from the power supply.

8. The welding-type system of claim 1, wherein the power supply is a first power supply configured to provide power to generate an arc at the welding-type torch, and further comprising a second power supply configured to provide power to the wire feeder.

9. The welding-type system of claim 1, wherein the controller is further configured to:
 monitor a time period of the calculated change in the pulsed output signal;
 compare the time period to a plurality of threshold time periods stored in a memory; and
 adjust the pulsed output signal based on the comparison.

10. The welding-type system of claim 1, further comprising a network connection, wherein the controller is further configured to receive information regarding threshold values from a remote source via the network connection to update the plurality of thresholds in memory.

11. The welding-type system of claim 1, wherein the controller is further configured to adjust the pulse interval by adjusting a frequency of the pulsed output signal.

12. The welding-type system of claim 11, wherein the controller is further configured to adjust the pulse interval by adjusting a length of one of a high voltage level or the low voltage level of the pulsed output corresponding to the second RMS value.

13. A welding-type system, comprising:
 a wire feeder to provide an electrode wire to a welding-type torch; and
 a welding-type power supply, comprising:
  a switched mode power supply configured to output power to one or both of the welding-type torch or the wire feeder;
  a sense voltage circuit configured to output a sense voltage signal separate from the power provided by the switched mode power supply; and
  a controller configured to:
   control the sense voltage circuit to output the sense voltage signal to an output of the power supply for the wire feeder;
   monitor a voltage feedback signal associated with the sense voltage signal at a voltage sensor over a predetermined period of time;
   determine if a value of the voltage feedback signal is increasing during the predetermined period of time;
   determine whether the wire feeder is activated or deactivated based on a change in the voltage feedback signal;
   receive an indication that the voltage feedback signal is increasing;
   control the switched mode power supply to provide a first pulsed power output after the predetermined period of time to operate the wire feeder in response to a determination that the wire feeder is activated; or
   in response to receiving an indication that the voltage feedback signal is not increasing, control the sense voltage circuit to continue to generate and provide the sense voltage signal and continue to monitor the sense voltage signal in response to the determination that the wire feeder is deactivated, wherein the sense voltage signal is separate from the first pulsed power output; and
   in response to detecting an arc, control the switched mode power supply to output a welding-type power output after the predetermined period of time.

14. The welding-type system of claim 13, wherein the controller is further configured to:

determine that the wire feeder is activated based on a first change in the voltage feedback signal; and determine that the wire feeder is deactivated based on a second change in the voltage feedback signal.

15. The welding-type system of claim 13, wherein the controller is further configured to determine an open circuit voltage condition at the output of the power supply for the wire feeder based on a third change in the voltage feedback signal.

16. The welding-type system of claim 13, wherein the controller is further configured to determine that one or more control capacitors of the wire feeder are being charged in response to a determination of an increased value.

17. The welding-type system of claim 13, wherein the controller is further configured to control the switched mode power supply to provide a constant voltage output signal during a welding type operation.

18. The welding-type system of claim 13, wherein the wire feeder is a sensing voltage wire feeder.

19. The welding-type system of claim 13, wherein the controller receives the voltage feedback signal in a closed control loop.

\* \* \* \* \*